US010706619B2

(12) United States Patent
Frederick et al.

(10) Patent No.: US 10,706,619 B2
(45) Date of Patent: Jul. 7, 2020

(54) SYSTEMS AND METHODS FOR EXTENDING DETACHABLE AUTOMOBILE SENSOR CAPABILITIES FOR ENVIRONMENTAL MAPPING

(71) Applicant: Toyota Motor Engineering & Manufacturing North America, Inc., Plano, TX (US)

(72) Inventors: Scott L. Frederick, Brighton, MI (US); Scott P. Robison, Dexter, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 29 days.

(21) Appl. No.: 16/128,728

(22) Filed: Sep. 12, 2018

(65) Prior Publication Data
US 2020/0082612 A1    Mar. 12, 2020

(51) Int. Cl.
*G06T 17/05* (2011.01)
*G06T 7/20* (2017.01)

(52) U.S. Cl.
CPC ............... *G06T 17/05* (2013.01); *G06T 7/20* (2013.01); *G06T 2200/08* (2013.01); *G06T 2207/30241* (2013.01); *G06T 2207/30252* (2013.01)

(58) Field of Classification Search
None
See application file for complete search history.

(56) References Cited

U.S. PATENT DOCUMENTS

| 5,034,747 A | 7/1991 | Donahue |
| 9,319,639 B1 | 4/2016 | Englander et al. |
| 9,829,891 B2 | 11/2017 | Smith et al. |
| 9,848,114 B2 | 12/2017 | Boudreau et al. |
| (Continued) | | |

FOREIGN PATENT DOCUMENTS

EP        2007120 A1    12/2018

OTHER PUBLICATIONS

Berman, B., "Connected Bicycles Tell Cars: Don't Run Me Over," Read Write Drive (Feb. 2, 2015) (last accessed Mar. 7, 2018).
(Continued)

*Primary Examiner* — Yingchun He
(74) *Attorney, Agent, or Firm* — Christopher G. Darrow; Darrow Mustafa PC

(57) ABSTRACT

Systems, methods, and other embodiments described herein relate to a manner of extending the use of originally-equipped automotive vehicle sensors to environmental mapping. In one embodiment, a method includes acquiring sensor data from a vehicle-equipped detachable sensor of an environment around a non-automotive entity when the vehicle-equipped detachable sensor is mounted to the non-automotive entity. The vehicle-equipped detachable sensor is capable of sensing a portion of an environment around an automotive vehicle and configured to communicate with a computing device. The vehicle-equipped detachable sensor is also structured to be detached from the automotive vehicle and mounted to the non-automotive entity. Further, the method includes receiving a mapping request from the computing device. The method also includes, in response to the mapping request, building a map, from the acquired sensor data, of an area traveled by the non-automotive entity.

20 Claims, 7 Drawing Sheets

(56) References Cited

U.S. PATENT DOCUMENTS

| | | |
|---|---|---|
| 2002/0158970 A1 | 10/2002 | Takeshi |
| 2009/0134985 A1 | 5/2009 | Schmitt et al. |
| 2009/0189981 A1 | 7/2009 | Siann et al. |
| 2011/0077891 A1* | 3/2011 | Koenig .................. G01P 21/00 702/104 |
| 2011/0307172 A1* | 12/2011 | Jadhav ................ G09B 21/001 701/491 |
| 2012/0010778 A1* | 1/2012 | Akatsuka ............. G01C 21/165 701/32.3 |
| 2013/0038731 A1 | 2/2013 | Brey et al. |
| 2013/0145279 A1 | 6/2013 | Ricci |
| 2014/0081479 A1 | 3/2014 | Vian et al. |
| 2014/0310610 A1 | 10/2014 | Ricci |
| 2018/0039273 A1 | 2/2018 | Delp et al. |
| 2018/0074518 A1 | 3/2018 | Cantrell et al. |
| 2018/0150083 A1 | 5/2018 | Izadian |

OTHER PUBLICATIONS

Chen et al., "Moveset: MOdular VEhicle SEnsor Technology," 2016 IEEE Vehicular Networking Conference (VNC), Columbus, OH, 2016. pp. 1-4.

* cited by examiner

SYSTEMS AND METHODS FOR EXTENDING DETACHABLE AUTOMOBILE SENSOR CAPABILITIES FOR ENVIRONMENTAL MAPPING

TECHNICAL FIELD

The subject matter described herein relates generally to sensors used in vehicle operation and, more particularly, to detaching the sensors from the automobile and utilizing these sensors for environmental mapping.

BACKGROUND

Automobiles are increasingly equipped with sensors that are configured to detect information about the surrounding environment, e.g., obstacles, roadways, etc. The information may be used by automobile systems to assist a driver in identifying and avoiding collisions with detected objects in the surrounding environment. Automobiles are parked and are sometimes underutilized for a portion of their lifespan. Current systems do not yet take advantage of otherwise idle, underutilized and in some instances, expensive sensor technology.

SUMMARY

Example systems and methods are disclosed herein that relate to a manner of extending the use of originally-equipped automotive vehicle sensors for environmental mapping. In one embodiment, a mapping system is disclosed. The mapping system includes a vehicle-equipped detachable sensor capable of sensing a portion of an environment around an automotive vehicle. The vehicle-equipped detachable sensor is configured to communicate with a computing device and is structured to be detached from the automotive vehicle and mounted to a non-automotive entity. The mapping system also includes one or more processors and a memory that is communicably coupled to the one or more processors. The memory stores a monitoring module including instructions that when executed by the one or more processors cause the one or more processors to acquire sensor data from the vehicle-equipped detachable sensor of an environment around the non-automotive entity when the vehicle-equipped detachable sensor is mounted to the non-automotive entity. The memory also stores a mapping module including instructions that when executed by the one or more processors cause the one or more processors to receive a mapping request from the computing device, and in response to the mapping request, build a map, from the acquired data, of an area traveled by the non-automotive entity.

In another embodiment, a method is disclosed. The method includes acquiring sensor data from a vehicle-equipped detachable sensor of an environment around a non-automotive entity when the vehicle-equipped detachable sensor is mounted to the non-automotive entity. The vehicle-equipped detachable sensor is capable of sensing a portion of an environment around an automotive vehicle and configured to communicate with a computing device. The vehicle-equipped detachable sensor is also structured to be detached from the automotive vehicle and mounted to the non-automotive entity. Further, the method includes receiving a mapping request from the computing device. The method also includes, in response to the mapping request, building a map, from the acquired sensor data, of an area traveled by the non-automotive entity.

In another embodiment, a tracking system is disclosed. The tracking system includes a vehicle-equipped detachable sensor capable of sensing a portion of an environment around an automotive vehicle. The vehicle-equipped detachable sensor is configured to communicate with a computing device and is structured to be detached from the automotive vehicle and mounted to a non-automotive entity. The tracking system also includes one or more processors and a memory that is communicably coupled to the one or more processors. The memory stores a monitoring module including instructions that when executed by the one or more processors cause the one or more processors to acquire sensor data from the vehicle-equipped detachable sensor of an environment around the non-automotive entity when the vehicle-equipped detachable sensor is mounted to the non-automotive entity. The memory also stores a tracking module including instructions that when executed by the one or more processors cause the one or more processors to determine tracking information about the non-automotive entity based at least in part on the acquired sensor data.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods and other embodiments associated with extending the usage of originally-equipped automotive vehicle sensors to take advantage of their rich environmental sensing capabilities are disclosed herein. Leveraging the sensor technology for use with other modes of transportation (herein referred to as "non-automotive entities") while an automotive vehicle is sitting unused and/or the sensor is not being utilizing can provide environmental mapping capabilities of an area traveled by the non-automotive entity. Furthermore, the non-automotive entity may be a user who adapts the sensor technology as a wearable device. In this case, the non-automotive entity, i.e., the wearable device user, may also benefit from the ability of mapping an area traveled by the wearable device user.

Accordingly, in one or more embodiments, a mapping system includes an original vehicle-equipped automotive sensor that is structured to be detached from the automotive vehicle and mounted to the non-automotive entity, e.g., a bicycle, a motorcycle, an all-terrain vehicle (ATV), etc. The operator of the non-automotive entity may benefit from the sensor capabilities by acquiring sensor data of the environment surrounding the non-automotive entity, which may be used to build a map of an area traveled by the non-automotive entity. When the non-automotive entity is targeted for the wearable device user, the vehicle-equipped automotive sensor is structured to be detached from the automotive vehicle and mounted to the wearable device user. In this case, the wearable device user may also benefit from the map building capabilities offered by the mapping system by acquiring sensor data of his/her surrounding environment while traveling a specific area.

Additionally, the mapping system, in one embodiment, can track the non-automotive entity and provide notification to a computing device regarding static and dynamic information, for example, a current trajectory, of the non-automotive entity. This is particularly useful for remote applications where the non-automotive entity is unmanned, e.g., unmanned ATV, aerial drone, etc.

In either case, the mapping system takes advantage of temporarily unused vehicle-equipped detachable sensors and repurposes them for building a map of an environment traveled by the non-automotive entity. In this way, the mapping system provides an operator of the non-automotive entity, the user that adapts the vehicle-equipped detachable sensor as a wearable device and/or a remote user of the mapping system with mapping capabilities of an environment traveled by the non-automotive entity. For example, the mapping system may be used for environmental mapping of wildfires and disaster areas, video game environmental data capture, determining the optimal path for future roads, capturing environmental mapping data of hard to reach areas, etc.

Figure 1:
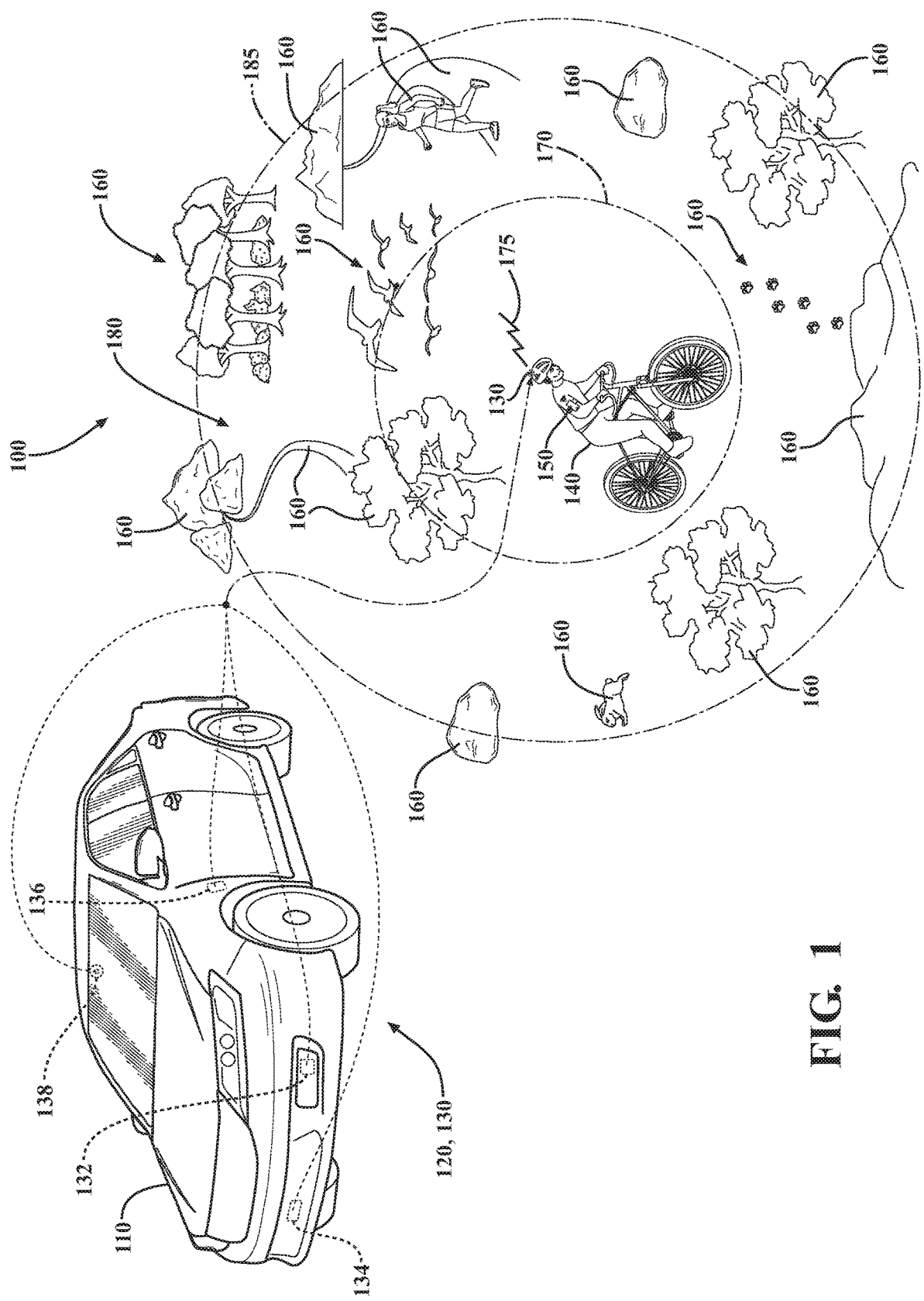
FIG. 1 illustrates a perspective view of an embodiment of a mapping system where a non-automotive entity receives a vehicle-equipped detachable sensor from an automotive vehicle.

FIG. 1 is an illustration of a mapping system 100 configured to incorporate one or more vehicle-equipped detachable sensors 130 from an automotive vehicle 110, in accordance with embodiments described herein. The mapping system 100 includes one or more vehicle-equipped detachable sensors 130, a non-automotive entity 140 and a computing device 150, e.g., a cell phone as shown in FIG. 1. For example, FIG. 1 shows the automotive vehicle 110 having a plurality of vehicle-equipped environmental sensors 120 configured as vehicle-equipped detachable sensors 130, e.g., a radar sensor 132, a LIDAR sensor 134, a sonar sensor 136 and a camera 138. The vehicle-equipped detachable sensors 130 are the vehicle-equipped environmental sensors 120: that are structured to be detached from the automotive vehicle 110 and mounted to the non-automotive entity 140 when the automotive vehicle 110 is not in use or not taking advantage of the vehicle-equipped detachable sensor 130, capable of sensing a portion of an environment around the automotive vehicle 110 and configured to communicate with the computing device 150.

As may be appreciated, in the context of vehicle manufacture, vehicle-equipped sensing devices may refer to those sensors assembled and installed during new automotive vehicle construction. Various vehicle-equipped sensor manufacturers may provide these devices to the specifications and requirements of the final automotive vehicle assembly and may have a relationship with the original automotive vehicle manufacturer, and accordingly, have access to operational and/or functional specifications for device integration with the automotive vehicle 110. The vehicle-equipped sensing devices, for example, the vehicle-equipped environmental sensors 120 and the vehicle-equipped detachable sensors 130, as shown in FIG. 1, may be part of an overall sensor system (not shown) defined for the automotive vehicle 110.

In contrast, aftermarket, third-party or non-vehicle-equipped sensing devices, are those sensing devices that may be installed as replacements for after-factory assembly. Non-vehicle-equipped manufacturers may not have access to the specifications and requirements of the original automotive vehicle manufacturer, and accordingly, non-vehicle-equipped sensing devices may not have the capacity to integrate with the sensor system of the automotive vehicle 110.

Additionally, some of the possible elements of the mapping system 100 are shown in FIG. 1 and will be described along with subsequent figures. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

The mapping system 100 may acquire sensor data 175 from the vehicle-equipped detachable sensors 130 of an environment 170 around the non-automotive entity 140 when the vehicle-equipped detachable sensors 130 are mounted to the non-automotive entity 140. Further, based on a mapping request received from the computing device 150, the mapping system 100 may build a map, from the acquired sensor data 175, of an area 180 traveled by the non-automotive entity 140. Furthermore, in one or more arrangements, as set forth below, the mapping system 100 can determine tracking information, for example, static and dynamic information, of the non-automotive entity 140 based at least in part on the acquired sensor data 175 from the vehicle-equipped detachable sensors 130. In this case, the mapping system 100 can output a tracking signal to the computing device 150 corresponding to the tracking information.

As an example, the mapping system 100 of FIG. 1 illustrates the non-automotive entity 140, for example, a bicyclist that has adapted the vehicle-equipped detachable sensor 130, e.g., the LIDAR sensor 134, as a wearable device by mounting the LIDAR sensor 134 on a helmet of the wearable device user. Further, the mapping system 100 receives a mapping request from the computing device 150. In this case, the request comes from, for example, a mobile device mounted to the wearable device user, i.e., the non-automotive entity 140. The initiation of the mapping request may have been entered by the wearable device user via, e.g., an application running on the computing device 150. In response to the mapping request, the LIDAR sensor 134 is configured to detect objects 160 in the environment 170 around the wearable device user, and the mapping system 100 builds a map from the acquired sensor data 175 of the area 180 traveled by wearable device user defined by geographic boundaries 185. The objects 160 may be, for example, trees, rocks, trails, roads, mountain landscapes, rivers, tree lines, humans, animals on the ground or in the air, footprints, other vehicles, etc. In some embodiments, as set forth below, the map may be in three dimensions (3D) and may be available in real-time. In one or more arrangements, tracking information of the wearable device user may be determined by the mapping system 100 and a corresponding tracking signal may be output to the computing device 150, e.g., the mobile device as shown in FIG. 1. The mapping system 100 may store the map in a memory located on the vehicle-equipped detachable sensor 130, the computing device 150 and/or a remote server 294 (FIG. 2), as set forth below.

Figure 2:
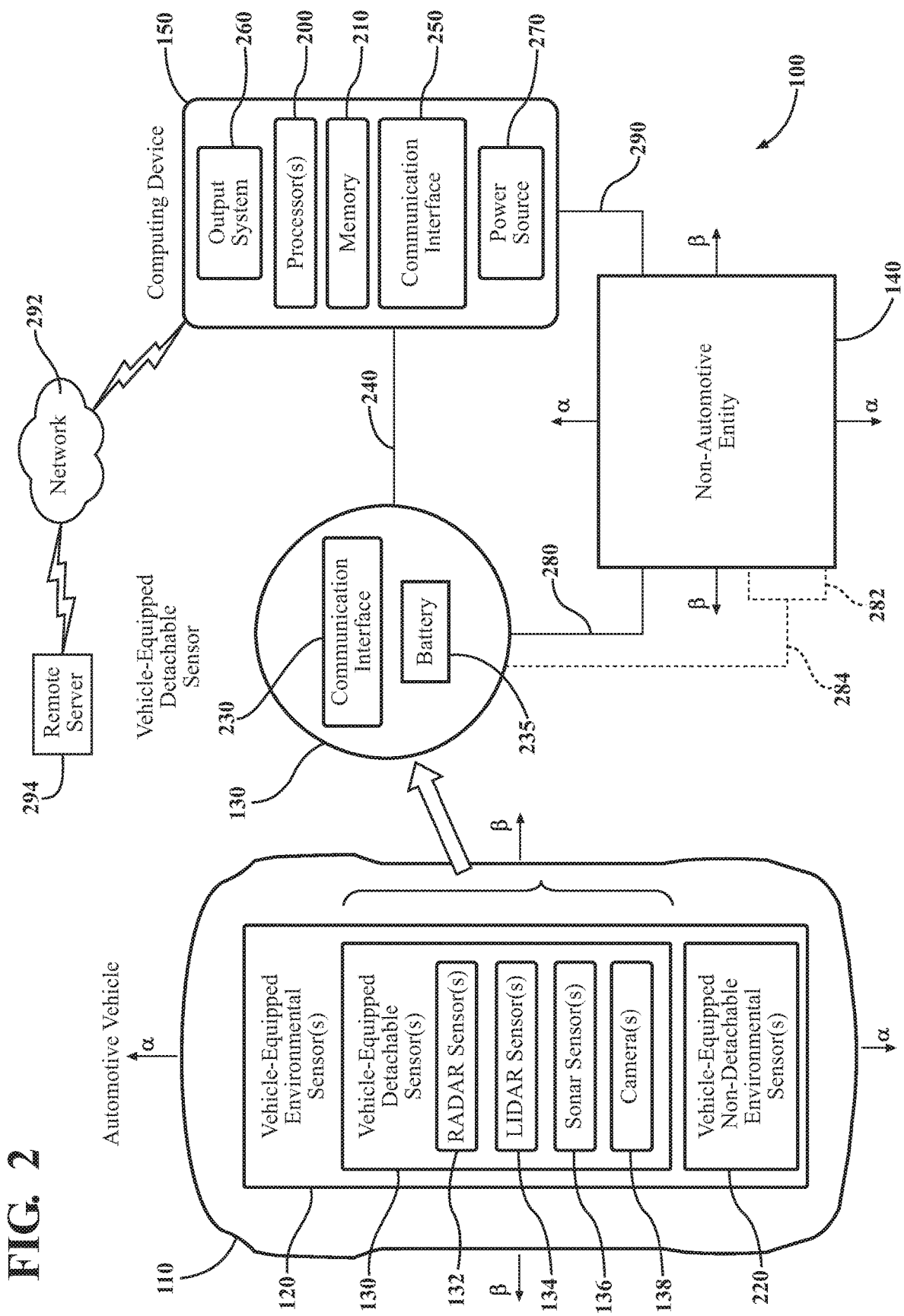
FIG. 2 is a block diagram of FIG. 1 illustrating the mapping system receiving the vehicle-equipped detachable sensor from the automotive vehicle.

FIG. 2 is a block diagram of the automotive vehicle 110 and the mapping system 100 of FIG. 1. The automotive vehicle 110 may be any form of motorized, electrical or hybrid transport, e.g., a car, truck, SUV, etc., that incorporates at least one of the vehicle-equipped environmental sensors 120 configured as the vehicle-equipped detachable sensor 130. It should be appreciated that not all the various elements required for operation of the automotive vehicle 110 are shown in FIG. 2. Only the elements of the automotive vehicle 110 that are pertinent to the various embodiments of the mapping system 100 will be discussed herein.

The automotive vehicle 110 may include the one or more vehicle-equipped environmental sensors 120. The vehicle-equipped environmental sensors 120 are configured to acquire, and/or sense driving environment data. "Driving environment data" includes data or information about the external environment in which the automotive vehicle 110 is located or one or more portions thereof. In one or more arrangements, the vehicle-equipped environmental sensors 120 can be configured to monitor in real-time. As used herein, the term "real-time" means a level of processing responsiveness that a system senses as sufficiently immediate for a particular process or determination to be made, or that enables a processor to keep up with some external process. It will be understood that in various embodiments of the mapping system 100, it may not be necessary for the automotive vehicle 110 to have all the vehicle-equipped environmental sensors 120 shown in FIG. 2.

The automotive vehicle 110 may include the one or more vehicle-equipped environmental sensors 120 that can be detached from automotive vehicle 110 (hereinafter referred to as "vehicle-equipped detachable sensors 130"). As shown in FIG. 2, for example, the vehicle-equipped detachable sensors 130 can include one or more radar sensors 132, one or more LIDAR sensors 134, one or more sonar sensors 136, and one or more cameras 138. Further, the automotive vehicle 110 can have additional sensors, including additional vehicle-equipped environmental sensors 120 configured as vehicle-equipped detachable sensors 130 now known or later developed, to those shown in FIG. 2, and it will be understood that the embodiments of the mapping system 100 are not limited to the specific vehicle-equipped detachable sensors 130 described herein. Furthermore, the vehicle-equipped detachable sensors 130 can be mounted internally within or mounted externally to the automotive vehicle 110.

The automotive vehicle 110 may include vehicle-equipped non-detachable environmental sensors 220 that are not configured as vehicle-equipped detachable sensors 130. An example of the vehicle-equipped non-detachable environmental sensors 220 may be the vehicle-equipped environmental sensors 120 that are not structured to be detached from the automotive vehicle 110, e.g., camera(s), LIDAR sensor(s), radar sensor(s), and/or sonar sensor(s). In other words, not all of the vehicle-equipped environmental sensors 120 may be configured as vehicle-equipped detachable sensors 130.

The non-automotive entities 140 of FIGS. 1 and 2 are any form of transport, for example, non-motorized, motorized, electric, hybrid, etc., all of which are not automotive vehicles 110, that may benefit from the additional capabilities realized by the mapping system 100, i.e., environmental mapping of the area 180 traveled by the non-automotive entity 140. For example, the vehicle-equipped detachable sensors 130 may be mounted to different types of non-automotive entities 140, which may include, e.g., bicycles, tricycles, tandem bicycles, wheelchairs, skateboards, scooters, motorcycles, ATVs, boats, jet skis, three or more wheeled motorized vehicles, snowmobiles, Segways, golf carts, wagons, aerial drones, etc. As set forth above, the non-automotive entity 140 may be a user that adapts the vehicle-equipped detachable sensor 130 as a wearable device. The non-automotive entity 140 may include other vehicle-equipped sensors that are not structured to be detached and mounted elsewhere (not shown), e.g., cameras, radar sensors, etc.

The vehicle-equipped detachable sensors 130 may not be required for operation of the automotive vehicle 110. However, the vehicle-equipped detachable sensors 130 may be required for proper operation. For example, the automotive vehicle 110 operation may be impaired without the vehicle-equipped detachable sensors 130 installed. In some cases, the automotive vehicle 110 may not operate unless the vehicle-equipped detachable sensors 130 are reattached to the automotive vehicle 110 and functioning properly. Each of the vehicle-equipped detachable sensors 130 described herein are structured to be detached from the automotive vehicle 110 and mounted to the non-automotive entity 140 when the automotive vehicle 110 is not in use or not utilizing the vehicle-equipped detached sensor functionality. Typically, the differences between the vehicle-equipped detachable sensor 130 and the comparable vehicle-equipped non-detachable environmental sensor 220 are, for example, the mechanical ability of the vehicle-equipped detachable sensor 130 to be detached from the automotive vehicle 110 and the ability of the vehicle-equipped detachable sensor 130 to communicate with the computing device 150. Otherwise, the two comparable sensors 130, 220 can function identically for their intended purposes.

In one or more arrangements, the vehicle-equipped detachable sensors 130 can include the one or more radar sensors 132. The radar sensors 132 can be any device, component and/or system that can detect a dynamic and/or stationary object using at least in part radio signals. The radar sensors 132 can be configured to detect the presence of one or more objects in a portion of the environment around the automotive vehicle 110, the position of detected objects relative to the automotive vehicle 110, the distance between each of the detected objects and the automotive vehicle 110 in one or more directions (e.g. in a longitudinal direction $\alpha$ of the automotive vehicle 110, a lateral direction $\beta$ of the automotive vehicle 110, as shown in FIG. 2, and/or other direction(s)), the elevation of each of the detected objects, the speed of each of the detected objects, and/or a movement of each of the detected objects. The radar sensors 132, or data obtained thereby, can determine or be used to determine the speed, position, and/or orientation of objects in the environment around the automotive vehicle 110. The radar sensors 132 can have three-dimensional coordinate data associated with the objects.

In one or more arrangements, the vehicle-equipped detachable sensors 130 can include the one or more LIDAR sensors 134. The LIDAR sensors 134 can be any device, component and/or system that can detect a dynamic and/or stationary object using at least in part electromagnetic signals. In one or more arrangements, the electromagnetic signals can be laser signals. The LIDAR sensors 134 can include a laser source and/or laser scanner configured to emit a laser signal and a detector configured to detect reflections of the laser signal. The LIDAR sensors 134 may be configured to operate in a coherent or an incoherent detection mode.

The LIDAR sensors 134 can be configured to detect the presence of one or more objects in a portion of the environment around the automotive vehicle 110, the position of each of the detected objects relative to the automotive vehicle 110, the distance between each of the detected objects and the automotive vehicle 110 in one or more directions, the elevation of each of the detected objects, the speed of each of the detected objects, and/or the movement of each of the detected objects. The LIDAR sensors 134 may be used to build 3-D maps of its surrounding environment.

In one or more arrangements, the vehicle-equipped detachable sensors 130 can include the one or more sonar sensors 136. The sonar sensors 136 can be any device, component and/or system that can detect a dynamic and/or stationary object using at least in part sound signals. For example, the sonar sensor 136 actively sends out a high-frequency sound pulse and then determines the time for the echo of the sound to reflect back. The sonar sensors 136 can be configured to detect multiple objects in a portion of the environment around the automotive vehicle 110, the position of each of the detected objects relative to the automotive vehicle 110, the distance between each of the detected objects and the automotive vehicle 110 in one or more directions, the speed of each of the detected objects, and/or the movement of each of the detected objects. Sonar sensors 136 may be used to perceive its surrounding environment in 3D.

In one or more arrangements, the vehicle-equipped detachable sensors 130 can include the one or more cameras 138. The cameras 138 can be any device, component, and/or system that can capture visual data. The visual data can include video and/or image information/data. The visual data can be in any suitable form. In one or more arrangements, visual data can include heat signatures, thermal images, and/or thermal video of a portion of the environment around the automotive vehicle 110. The cameras 138 can be configured to detect multiple objects relative to the automotive vehicle 110. The cameras 138 may be arranged to determine a distance of each of the detected objects relative to the automotive vehicle 110 by, e.g., by a processor using triangle similarity techniques in conjunction with pixel measurements of a captured image. The cameras 138 may also be arranged to determine a speed of the detected object, e.g., by a processor tracking the determined distance over time. A single camera 138 may form a three-dimensional map of its environment by, for example, stitching together multiple images from consecutive frames of video footage.

The cameras 138 can be any suitable type of camera. For instance, the cameras 138 can be high resolution cameras, high dynamic range (HDR) cameras, infrared (IR) cameras, and/or thermal imaging cameras.

The vehicle-equipped detachable sensor 130 includes a communication interface 230 configured to communicate with the computing device 150. In other words, the vehicle-equipped detachable sensor 130 is configured to wirelessly communicate with the computing device 150. The communication interface 230 may be configured for wired and/or wireless communication with the computing device 150 via a first link 240 and may be implemented by any number of communication protocols such as Ethernet, the Controller Area Network (CAN) protocol, Wi-Fi, the Local Interconnect Network (LIN) protocol, Bluetooth®, Bluetooth® Low Energy, the Universal Serial Bus (USB) protocol etc.

In one or more arrangements, the vehicle-equipped detachable sensor 130 may include a battery 235 to power components of the vehicle-equipped detachable sensor 130. The battery 235 may be a rechargeable lithium-ion battery, or the like. In other arrangements, the vehicle-equipped detachable sensor 130 may not include the battery 235 and receive power from a power source 270 of the computing device 150 via the first link 240, as set forth below.

The computing device 150 includes devices that are configured to communicate with the vehicle-equipped detachable sensor 130 in a wired and/or wireless fashion, as set forth below. The computing device 150 may be mounted to the non-automotive entity 140, e.g., a wearable device user as shown in FIG. 1. The computing device 150 may be carried by an operator of the non-automotive entity 140, for example, a driver of an ATV. The computing device 150 may be, for example, a smart phone, a tablet, phablets, laptop computer, etc., or any other computing device 150 that may be mounted to the non-automotive entity 140, which includes the wearable device user, and/or be able to be carried by the operator. The computing device 150 may be, e.g., a smart display, that is configured to communicate with the vehicle-equipped detachable sensors 130 and mounted to the non-automotive entity 140. Alternatively, the computing device 150 may be an existing, e.g., integrated, display of the non-automotive entity 140 that is configured to communicate with the vehicle-equipped detachable sensors 130. For example, the existing display of the non-automotive entity 140 may pair, e.g., wirelessly connect via Bluetooth technology, with the vehicle-equipped detachable sensor 130 via the communications interface 230.

The components of the computing device 150, in one embodiment, include an output system 260, the power source 270, a communication interface 250, one or more processors 200 and a memory 210. The processor(s) 200 and the memory 210 will be discussed in greater detail below.

The output system 260 of the computing device 150 is operatively connected to the processor(s) 200 of the computing device 150. The output system 260 includes any device, component, or arrangement or groups thereof that enable information/data to be presented to the operator of the non-automotive entity 140 or in the case of the wearable device user, the non-automotive entity 140 her/himself. For example, the output system 260 may include a mobile display, mobile speakers, haptic vibration motors, a light emitting diode (LED) flash, computer monitor, speakers, etc. As use herein, operatively connected can include direct or indirect connections, including connections without direct physical contact.

The power source 270 provides power to one or more components of the computing device 150. The power source 270 may be a rechargeable lithium-ion battery, a computer power supply, or the like. In one embodiment, the power source 270 supplies power via one or more wires to the vehicle-equipped detachable sensors 130 via the first link 240, as set forth above. In yet another arrangement, the vehicle-equipped detachable sensor 130 may include the battery 235 and the computing device 150 may include the power source 270. In this case, either the battery 235 or the power source 270 may recharge the other.

The communication interface 250 of the computing device 150 facilitates wired or wireless communication between the components of the computing device 150 and the vehicle-equipped detachable sensors 130 and/or between components of the computing device 150 and the remote server 294 via a network 292. The communication interface 250 may be programmed to communicate in accordance with any number of wired or wireless communication protocols. For instance, the communication interface 250 may be programmed to communicate in accordance with a satellite-communication protocol, a cellular-based communication protocol (LTE, 3G, etc.), Bluetooth®, Bluetooth® Low Energy, Ethernet, the Controller Area Network (CAN) protocol, Wi-Fi, the Local Interconnect Network (LIN) protocol, the Universal Serial Bus (USB) protocol, etc. As discussed in greater detail below, in one embodiment, the communication interface 250 receives sensor data 175 from the vehicle-equipped detachable sensor 130 and passes that sensor data 175 to the processor(s) 200, stores that sensor data 175 in the memory 210 and/or passes the sensor data 175 to the remote server 294.

The mapping system 100 may include the remote server 294. The remote server 294 may communicate with the communication interface 250 of the computing device 150 via the network 292. The remote server 294 is a computer including one or more processors and a memory, the memory stores instructions which may be executed by the processor(s). For example, as discussed in greater detail below, the remote server 294 may receive and store the acquired sensor data 175 from the vehicle-equipped detachable sensors 130 and/or the map built by the mapping system 100 via the communication interface 250 of the area 180 traveled by the non-automotive entity 140.

The mapping system 100 may include the network 292. The network 292 represents one or more mechanisms by which the computing device 150 and the remote server 294 may communicate with each other. The network 292 may include one or more known networks and/or networking technologies, such as wireless communication networks (e.g., Bluetooth, IEEE 802.11, etc.), a cellular network, local area networks (LAN) and/or wide area networks (WAN), including the Internet, providing data communication services.

The mapping system 100 includes a second link 280 between the vehicle-equipped detachable sensor 130 and the non-automotive entity 140 for each vehicle-equipped detachable sensor 130 of the mapping system 100. The second link 280 may include, for example, a mechanical device that mounts the vehicle-equipped detachable sensor 130 to the non-automotive entity 140, e.g., straps, fasteners, zip-ties and/or Velcro®, etc. The second link 280 may include, for example, a mechanical device that receives the vehicle-equipped detachable sensor 130 and directly mounts it to the non-automotive entity 140. That is, the second link 280 may be a mechanical device that adapts the vehicle-equipped detachable sensor 130 as a wearable device so that the non-automotive entity 140 may wear the vehicle-equipped detachable sensor 130. The mechanical device of the second link 280 may be, for example, a belt having compartments to receive the vehicle-equipped detachable sensor 130, pockets that may receive the vehicle-equipped detachable sensor 130, hooks attached to clothing of the non-automotive entity 140 to receive the vehicle-equipped detachable sensor 130, etc. As set forth below, the one or more second links 280 may include a wired or wireless link that facilitates communication between the communication interface 230 of the vehicle-equipped detachable sensors 130 and the non-automotive entity 140.

In one or more arrangements, the vehicle-equipped detachable sensor 130 may be mounted to the non-automotive entity 140 indirectly. That is, the mapping system 100 may include an intermediate device 282 and an intermediate mechanical link 284 both of which are between the non-automotive entity 140 and the vehicle-equipped detachable sensor 130, as shown in hidden lines in FIG. 2. In this case, the vehicle-equipped detachable sensor 130 is mounted to the intermediate device 282 via the intermediate mechanical link 284 and the intermediate device 282 is directly mounted to the non-automotive entity 140. For example, the intermediate device 282 may be a helmet that is mounted directly to the head of the non-automotive entity 140, as illustrated in FIG. 1, a gun that is held directly by hands of the non-automotive entity 140, skis that extend directly from feet of the non-automotive entity 140, a backpack that protrudes directly from a back of the non-automotive entity 140, etc. The intermediate mechanical link 284 may be any suitable fastening device, e.g., clips, ties, bands, etc. Further, for the case where the mapping system 100 includes one or more vehicle-equipped detachable sensors 130, the mapping system 100 may include the second link 280 directly mounting the one or more vehicle-equipped detachable sensors 130 to the non-automotive entity 140, the intermediate mechanical link 284 indirectly mounting the one or more vehicle-equipped detachable sensors 130 to the non-automotive entity 140 or both.

The mapping system 100, in one arrangement, includes a third link 290 between the computing device 150 and the non-automotive entity 140. The third link 290 may include a mechanical device that receives the computing device 150 and directly mounts it to the non-automotive entity 140, e.g., as shown in FIG. 1. The mechanical device of the third link 290 may be, for example, a pocket attached to the non-automotive entity 140 that may receive the computing device, a Velcro strap that is attached to the computing device 150 and an arm of the non-automotive entity 140, etc. In another arrangement, the third link 290 may simply be a hand of the non-automotive entity 140 that carries the computing device 150, which acts as a direct method of mounting the computing device 150 to the non-automotive entity 140. In another arrangement, the computing device 150 may be indirectly mounted to the non-automotive entity 140 via an intermediate mechanical link 284 between the computing device 150 and an intermediate device 282 that is mounted to the non-automotive entity 140 (not shown). In yet another arrangement, the third link 290 may include, for example, a wired and/or a wireless communication link between the computing device 150 and the non-automotive entity 140.

The second and third links 280, 290 may include, for example, one or more connectors (not shown) that electrically couple and mechanically mount both the vehicle-equipped detachable sensor 130 and the computing device 150 to the non-automotive entity 140. For example, the second and third links 280, 290 may be one or more sockets (not shown) that receive and mechanically mount the vehicle-equipped detachable sensor 130 and the computing device 150 to the non-automotive entity 140 while providing, e.g., a wired interface that facilitates electrical communications between the vehicle-equipped detachable sensor 130 and the computing device 150, i.e., incorporates the first link 240.

The vehicle-equipped detachable sensors 130 are structured to be detached from the automotive vehicle 110 and mounted to the non-automotive entity 140 when the automotive vehicle 110 is not in use or not utilizing the vehicle-equipped detached sensor functionality. Accordingly, the vehicle-equipped detachable sensors 130 are structured such that they may be man-portable, i.e., the vehicle-equipped detachable sensors 130 may be extracted from, e.g., a housing cavity, by a single human user and may be carried by a single human user without assistance of devices. The vehicle-equipped detachable sensors 130 are also structured to be mounted to the non-automotive entity 140. For example, the vehicle-equipped detachable sensors 130, once removed from the automotive vehicle 110, are of reasonable size and weight to mount to the various types of non-automotive entities 140, e.g., the size of a deck of cards and weighing less than one kilogram.

In arrangements in which the mapping system 100 includes a plurality of vehicle-equipped detachable sensors 130, the plurality of vehicle-equipped detachable sensors 130 can be distributed about the non-automotive entity 140 in any suitable manner. The vehicle-equipped detachable sensors 130 can work independently from each other or in combination with each other. In such case, the two or more vehicle-equipped detachable sensors 130 can form a sensor network.

The vehicle-equipped detachable sensors 130, which are configured to acquire and/or sense driving environment data as set forth above, are also configured to acquire and/or sense driving environment data around the environment of the non-automotive entity 140 or portions thereof when the vehicle-equipped detachable sensors 130 are mounted to the non-automotive entity 140. For instance, the vehicle-equipped detachable sensors 130 can be configured to acquire sensor data 175 of at least a forward portion and/or at least a rearward portion of the environment around the non-automotive entity 140. For example, the vehicle-equipped detachable sensors 130 can monitor a forward portion along a longitudinal direction α of the non-automotive entity 140 in front of the non-automotive entity 140, and/or monitor the rearward portion along the longitudinal direction α of the non-automotive entity 140 behind the non-automotive entity 140, as shown in FIG. 2.

Additionally, or alternatively, the vehicle-equipped detachable sensors 130 can be configured to acquire sensor data 175 of at least a side portion of the environment around the non-automotive entity 140 when the vehicle-equipped detachable sensors 130 are mounted to the non-automotive entity 140. The side portion can be, for example, a portion of the environment that is located between the forward portion and the rearward portion of the non-automotive entity 140. For example, the vehicle-equipped detachable sensors 130 can be configured to monitor a left side and/or a right side portion along a lateral direction β of the non-automotive entity 140, as shown in FIG. 2.

In either case, the mapping system 100 is implemented to perform methods and functions as disclosed herein relating to extending the use of temporarily idle vehicle-equipped detachable sensors 130 to acquire sensor data 175 of the environment 170 around the non-automotive entity 140, which may be used to build a map of the area 180 traveled by the non-automotive entity 140 in response to receiving a mapping request from the computing device 150. In some embodiments, the mapping system 100 determines the tracking information about the non-automotive entity 140 and provides notification via the computing device corresponding to the tracking information. The noted functions and methods will become more apparent with a further discussion of the figures.

Figure 3:
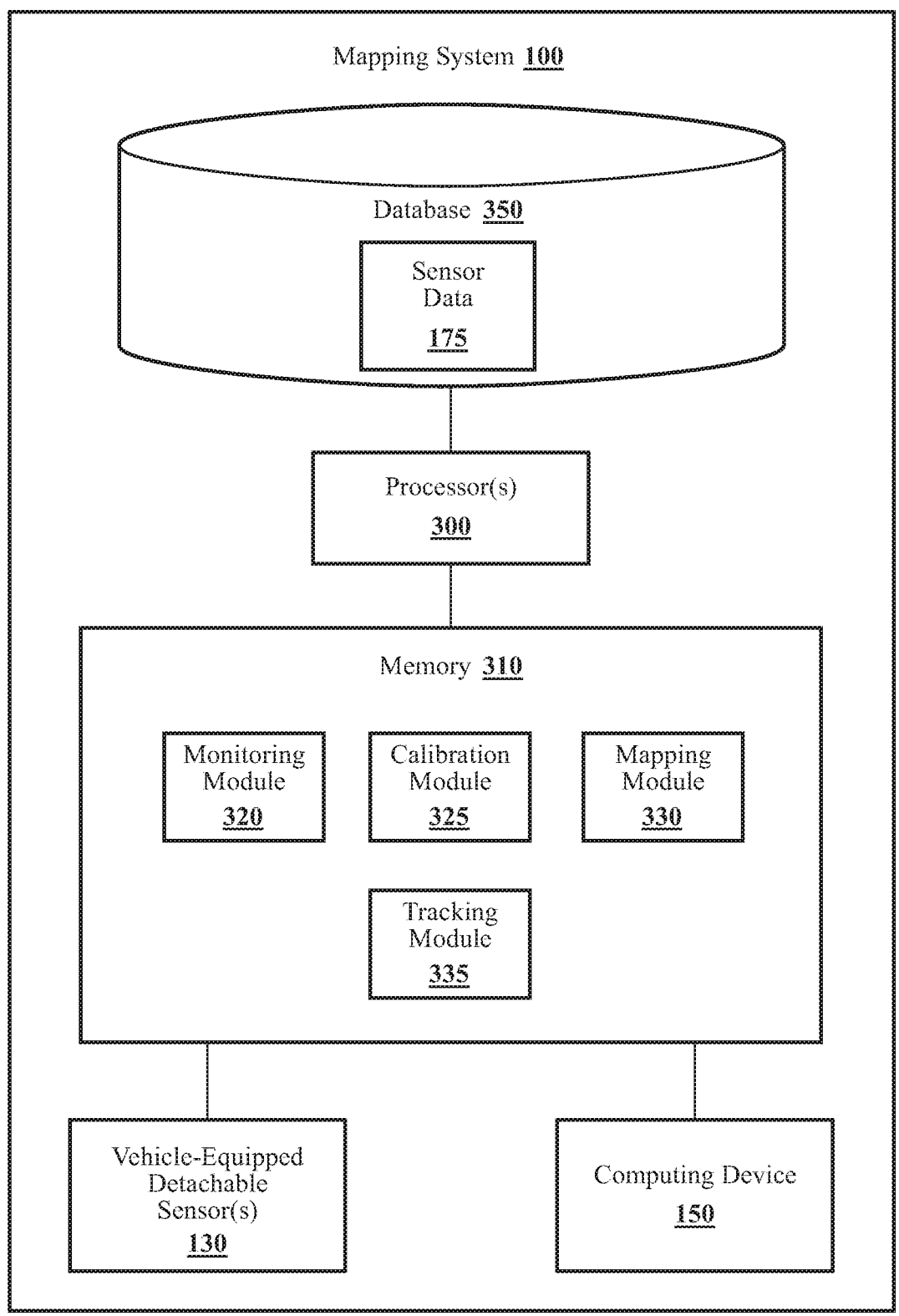
FIG. 3 illustrates one embodiment of a mapping system that is associated with extending the use of the vehicle-equipped detachable sensors to environmental mapping.

FIG. 3 illustrates one embodiment of the mapping system 100 of FIGS. 1 and 2 that provides the benefit of environmental object detection, notification, and in one or more arrangements, control for a type of non-automotive entity 140, e.g., a bicycle, motorcycle, ATV, a wearable device user, etc. The mapping system 100 can include one or more processors 300. The processor(s) 300 can be any component or group of components that are configured to execute any of the processes described herein or any form of instructions to carry out such processes or cause such processes to be performed. Examples of suitable processor(s) 300 can include microprocessors, microcontrollers, digital signal processors, and other circuitry that can execute software. Further examples of suitable processor(s) 300 include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 300 can include at least one hardware circuit (e.g., an integrated circuit) configured to carry out instructions contained in program code. In arrangements in which there is a plurality of processors 300, such processors can work independently from each other or one or more processors can work in combination with each other.

The mapping system 100 can include a computer readable medium. In one or more arrangements, the computer readable medium can be a memory 310. Additionally, in one embodiment, the memory 310 stores a monitoring module 320, a calibration module 325, a mapping module 330, and a tracking module 335. The memory 310 is a random-access memory (RAM), read-only memory (ROM), a hard-disk drive, an external hard-disk drive, a flash memory, or other suitable memory for storing the modules 320, 325, 330, and 335. The modules 320, 325, 330, and 335 are, for example, computer-readable instructions that when executed by the processor(s) 300 cause the processor(s) 300 to perform the various functions of the mapping system 100 disclosed herein. In one or more arrangements, the memory 310 can be a component of the processor(s) 300. In one or more arrangements, the memory 310 can be operatively connected to the processor(s) 300 and used thereby.

The processor(s) 300 and the memory 310 of the mapping system 100 may be completely contained within the computing device 150, the remote server 294 or be distributed among the computing device 150 and the remote server 294. The processor(s) 200 and the memory 210 of the computing device 150 may be a part of the mapping system 100, the mapping system 100 may include separate processor(s) and memory from the processors(s) 200 and the memory 210, or the mapping system 100 may access the processor(s) 200 and the memory 210 through a data bus or another communications path. In the same manner as the computing device 150, the processor(s) and memory of the remote server 294 may include the processor(s) 300 and/or memory 310 functionality. As an example of a distributed mapping system 100, the computing device 150 may include one of the processors 300 and the memory 310 executing and storing the monitoring module 320, respectively and the remote server 294 may include at least one of the processors 300 and the memory 310 executing and storing the mapping module 330 and the tracking module 335, respectively.

In either case, in one or more arrangements of the mapping system 100, the computing device 150 may include at least one of the one or more processors 300 and the memory 310, and the remote server 294 may include at least one of the one or more processors 300 and the memory 310. The processor(s) 200, the processor(s) of the remote server 294 and the processor(s) 300, may be operatively connected to each other and may process any portion of the modules 320, 325, 330, and 335 in any combination. The memory 210, the memory of the remote server 294 and the memory 310 may be operatively connected to each other and may store any portion of the modules 320, 325, 330, and 335 in any combination.

With continued reference to FIG. 3, in one embodiment, the monitoring module 320 includes instructions that function to control the processor(s) 300 to acquire sensor data 175 from vehicle-equipped detachable sensors 130 of the environment 170 around the non-automotive entity 140 when the vehicle-equipped detachable sensors 130 are mounted to the non-automotive entity 140. The sensor data 175 may be of the form, e.g., image data from the cameras 138, three-dimensional reflective data (from, e.g., the radar sensors 132, the LIDAR sensors 134, the sonar sensors 136), etc. Specifically, the monitoring module 320 collects sensor data 175 acquired from the vehicle-equipped detachable sensors 130 and stores the sensor data 175 in a database 350.

The database 350 is, for example, an electronic data structure stored in the memory 310 or another electronic data store and is configured with routines that can be executed by the processor(s) 300 for analyzing stored data, providing stored data, organizing stored data, and so on. Thus, in one embodiment, the database 350 stores data used/provided by the modules 320, 325, 330, and 335 in executing various functions. The vehicle-equipped detachable sensors 130 can be operatively connected to the processor(s) 300, the database 350, the memory 310, and/or any other modules stored in the memory 310.

The monitoring module 320, in one or more arrangements, configures the vehicle-equipped detachable sensors 130 to detect objects 160 associated with the acquired sensor data 175 in the environment 170 around the non-automotive entity 140. Detecting objects can include, for example, determining, assessing, monitoring, measuring, quantifying and/or sensing, directly or indirectly, the presence of one or more dynamic and/or stationary objects 160 in the environment 170 around the non-automotive entity 140. Additionally, the monitoring module 320 can determine if the detected object 160 is small enough such that its presence in the environment around the non-automotive entity 140 is insignificant and may disregard the detected object 160.

The calibration module 325, in one embodiment, includes instructions that function to control the processor(s) 300 to calibrate the vehicle-equipped detachable sensor 130 once mounted on the non-automotive entity 140. Typically, when the vehicle-equipped detachable sensor 130 is detached from the automotive vehicle 110 and mounted to the non-automotive entity 140, the vehicle-equipped detachable sensor 130 may require calibration. That is, the vehicle-equipped detachable sensor 130 may need to be configured to a mounting location on the non-automotive entity 140 so that the acquired sensor data 175 from the monitoring module 320 is representative of the environment around the non-automotive entity 140.

In one embodiment, the calibration module 325 calibrates the vehicle-equipped detachable sensor 130 to the mounting location on the non-automotive entity 140 by accessing and using acquired sensor data 175 from the monitoring module 320 and mounting location parameters associated with the mounting location of the vehicle-equipped detachable sensor 130 on the non-automotive entity 140. For example, the calibration module 325 may require values of parameters for, e.g., a measured height at which the vehicle-equipped detachable sensor 130 is mounted with respect to the ground, a measured distance a known object is from the vehicle-equipped detachable sensor 130 once mounted on the non-automotive entity 140, etc. The calibration module 325 may receive values of the mounting location parameters from, e.g., the operator entering the value into the computing device 150 (e.g., a calibration application running on the computing device 150), etc. Thus, the calibration module 325, in one arrangement, calibrates the vehicle-equipped detachable sensor 130 to a portion of the environment around the non-automotive entity 140 based at least in part on mounting location parameters associated with the mounting location of the vehicle-equipped detachable sensor 130 on the non-automotive entity 140.

In one arrangement, the calibration module 325 may determine the measured height and the measured distance directly, as is known. In other words, the vehicle-equipped detachable sensor 130 may be capable of automatic calibration. In this instance, the calibration module 325 includes instructions that function to control the processor(s) 300 to access other sensing components of the computing device 150 (not shown) to assist in providing the necessary values of the mounting location parameters to the calibration module 325, e.g., the mounting height, the measured distance, the orientation of the vehicle-equipped detachable sensor 130 with respect to the non-automotive entity 140, etc. The calibration module 325 may require any suitable type of mounting location parameters to calibrate the vehicle-equipped detachable sensor 130 to the mounting location on the non-automotive entity 140, e.g., a mounting angle from the longitudinal direction α of the non-automotive entity 140, a mounting angle from the lateral direction θ of the non-automotive entity 140, a mounting angle from ground, etc. Further, the calibration module 325 may access and use acquired sensor data 175 from the monitoring module 320, and/or request that the monitoring module 320 acquire new sensor data 175, e.g., when the measured distance of the known object has changed, when the vehicle-equipped detachable sensor 130 needs to be re-calibrated as determined by the calibration module 325, the operator or the non-automotive entity, i.e., the wearable device user, etc.

The calibration module 325 may store a calibration that includes the mounting location parameters in the memory 210 of the computing device 150 and/or the memory 310 of the vehicle-equipped detachable sensor 130, if the vehicle-equipped detachable sensor 130 is so equipped. The calibration may be indexed by, e.g., a sensor type, a mounting location, a calibration date, etc., so that calibration module 325 can retrieve and use the calibration in lieu of re-calibrating the same vehicle-equipped detachable sensor 130 to the same mounting location.

Alternatively, the vehicle-equipped detachable sensor 130 may not need calibration if it is utilized in a specific manner. For example, the vehicle-equipped detachable sensor 130 may not require calibration if it is mounted on the non-automotive entity 140 at a certain height from the ground. As another example, the vehicle-equipped detachable sensor 130 may not require calibration if it is being used to sense objects that are within a specified distance from the from the vehicle-equipped detachable sensor 130, e.g., 20 meters, etc.

The mapping module 330, in one embodiment, includes instructions that function to control the processor(s) 300 to receive the mapping request from the computing device 150, and in response to the mapping request, build a map, from the acquired sensor data 175, of the area 180 traveled by the non-automotive entity 140. The mapping request may be initiated by the operator of the non-automotive entity 140 via, e.g., an application running on the computing device 150. The mapping request from the computing device 150 may be initiated from the remote server 294 via the network 292 and the communication interface 250 of the computing device 150. As illustrated below, the mapping request may come from a remote computing device 450 (FIG. 4) via the network 292.

The mapping module 330, in one or more arrangement, includes instructions to store the map of the area 180 to the memory 310 of the mapping system 100 based on storage instructions received from the computing device to, for example, conserve memory usage, optimize memory usage, etc. As set forth above, the memory 310 may physically reside on the computing device 150 and/or the remote server 294.

The mapping module 330 may build the map from the acquired sensor data 175 while the non-automotive entity 140 is traveling the area 180 and store the map to the memory 310. The mapping module 330 may build the map that includes a real-time map, which is discussed further below. The mapping module 330 may, for example, build the map of the area 180 from the acquired sensor data 175 stored in the database 350 after the non-automotive entity 140 has traveled the area 180.

The storage instructions received from the computing device 150 may be initiated from the operator of the non-automotive entity 140 or the wearable device user via, for example, an application running on the computing device 150, or the remote server 294. The storage instructions may include a time interval. The time interval received from the computing device 150 may be a time value representing the time between when the mapping module 330 stores the map built by the mapping module 330 to the memory 310. For example, the time interval may be 1 minute, 30 seconds, 10 seconds, 1 second, etc. The map built at each time interval would represent the environment 170 around the non-automotive entity 140 at that instant of time. The map of the area 180 may be dynamically built while the non-automotive entity 140 is traveling the area 180 with sections of the environment 170 stored in the memory 310 at each interval. Alternatively, the map may be built from the sections after the non-automotive entity 140 travels the area 180. The resolution of the map may be increased as the time interval is decreased at the cost of more memory usage.

The storage instructions may include a distance interval received from the computing device 150. The distance interval is a distance value representing the distance between when the mapping module 330 stores the map built by the mapping module 330. For example, the distance interval may be 1 kilometer, ½ kilometer, 100 meters, 10 meters, 1 meter, etc. In a similar manner as the time interval, the map built at each distance interval would represent the environment 170 around the non-automotive entity 140 at that successive distance interval marker as traveled by the non-automotive entity 140. The resolution of the map may be increased by decreasing the distance interval at a cost of more memory usage. The mapping module 330 may receive the distance traveled by the non-automotive entity 140 from the tracking information determined by the tracking module 335, as set forth below.

The time interval and the distance interval are two methods to conserve or optimize the memory 310 usage. Any suitable method of memory conservation and/or optimization may be used. For example, techniques may be employed to build, for example, a three-dimensional (3D) map by utilizing two-dimensional (2D) sense data from the fusion of two or more vehicle-equipped detachable sensors 130, which may consume less memory and processor resources. In contrast, the storage instructions may include an instruction to build a real-time map that the mapping module 330 receives from the computing device 150.

The area 180, in one or more arrangements, may be based on the geographic boundaries 185 received from the computing device. The geographic boundaries 185 may be initiated from the operator of the non-automotive entity 140 or the wearable device user via, for example, an application running on the computing device 150, or the remote server 294. The geographic boundaries 185 may be values, for example, longitude and latitude coordinates, etc., that may be recognized by a navigation system of the computing device 150 mounted to the non-automotive entity 140. The mapping module 330 may utilize the values of the geographic boundaries 185 in conjunction with, e.g., time-stamped sensor data 175, to build the map of the area 180 specified by the geographic boundaries 185. The operator of the non-automotive entity 140 or the wearable device user may follow the geographic boundaries 185 by observing the values of the geographic boundaries 185 on, for example, a display of the computing device 150, e.g., a cell phone display.

The mapping module 330, in one arrangement, may utilize the acquired sensor data 175 to build the map that includes a two-dimensional (2D) map. A 2D map, for example, is typically used for route generation because it has information only about a horizontal or vertical section. The mapping module 330 may also utilize the acquired sensor data 175, in one arrangement, to build a map that includes a 3D map. In contrast, a 3D map includes, for example, height values that can not only be used for generating routes but provide depth of an environmental terrain. Accordingly, the generated 3D maps that are built from the 3D sensor data 175 may provide elevation, which in turn would allow the 3D maps to discern such features as, for example, landforms, lakes, rivers, forest cover, transportation routes, roads, railways, rock formations, etc., as well as other non-terrain type features, such as lifeforms, houses, vehicles, or any other type of 3D object.

The mapping module 330, in one arrangement, includes instructions to build a map that includes the real-time map. The mapping module 330 may build a real-time map of the area 180 traveled by the non-automotive entity 140, for example, by a request from the computing device 150. As set forth below, the real-time map built by the mapping module 330 may enhance autonomous operation of an autonomous capable non-automotive entity 440 (FIG. 4) where it is imperative that a map of the environment 170 be built quickly enough for the autonomous control system to react to changes in the environment 170. In other words, the real-time map built by the mapping system 100, for example, has a level of processing responsiveness to provide a map of the environment 170 quick enough that is sufficiently immediate for fully autonomous mode operation without human intervention.

The tracking module 335, in one or more arrangements, includes instructions that function to control the processor(s) 300 to determine tracking information about non-automotive entity 140. The tracking information may include at least one of a position of the non-automotive entity 140, a velocity of the non-automotive entity 140, an elevation of the non-automotive entity 140, a current trajectory of the non-automotive entity 140 and a predicted trajectory of the non-automotive entity 140. The determination of the tracking information is based at least in part on the acquired sensor data 175. The tracking information may include any suitable static or dynamic information regarding the non-automotive entity 140.

The tracking module 335 may determine the tracking information using any suitable method. For example, the tracking module 335 may determine the dynamic information, e.g., speed, acceleration, deceleration, etc., of non-automotive entity 140 directly from acquired sensor data 175 of the vehicle-equipped detachable sensor 130 (e.g., the radar sensor 132, the LIDAR sensor 134, the sonar sensor 136) or indirectly, for example, by comparing environmental changes from the camera 138 images over time. The tracking module 335 may determine the position of the non-automotive entity 140 relative to detected objects 160 in the environment 170 or the area 180. As set forth above, the mapping module 330 may receive the tracking information from the tracking module 335 when building the map. The tracking module 335 may determine the current trajectory and/or the predicted trajectory, i.e., future trajectory, of the non-automotive entity 140 (if any) from the instant direction, acceleration/deceleration and velocity determinations of the non-automotive entity 140. The predicted trajectory of the non-automotive entity 140 may, for example, be based on the continuation of the current direction and the movement of the non-automotive entity 140. The non-automotive entity 140 may have suddenly changed course, and the predicted travel trajectory may be based on the continuation and the new direction and the movement of the non-automotive entity 140. The position and dynamic information, which may include direction and orientation of the non-automotive entity 140, may be determined by the tracking module 335 from any type of environmental or contextual information collected by the vehicle-equipped detachable sensors 130. The tracking module 335 may determine, for example, the location of the non-automotive entity 140 relative to the geographic boundaries 185 based on the data received from the navigation unit of the computing device 150. Different calibrations determined by the calibration module 325 may affect the tracking information. The non-automotive entity 140 may be stationary at any time when the tracking module 335 is determining the tracking information.

The tracking module 335, in one embodiment, includes instructions that function to output at least one tracking signal to the computing device 150 in response to determining the tracking information of the non-automotive entity 140. For example, the tracking module 335 may output at least one tracking signal to the computing device 150 to inform the operator, or the non-automotive entity 140 that has adapted the vehicle-equipped detachable sensor 130 as a wearable device, of the position of the non-automotive entity 140, the velocity and derived acceleration/deceleration of the non-automotive entity 140, the elevation of the non-automotive entity 140, the current trajectory of the non-automotive entity 140 and/or a predicted trajectory of the non-automotive entity 140. The tracking module 335 may include the location of the non-automotive entity 140 relative to the geographic boundaries 185 as part of the tracking signal, which may be determined by, for example, the navigation unit of the computing device 150, as set forth above. It should be noted that the present disclosure is not limited to these enumerated examples.

The tracking signal may have multiple components such that a variety of perceptible content can be delivered to the operator or the non-automotive entity 140, i.e., wearable device user, via the computing device 150. The processor(s) 200 of the computing device 150 may parse the tracking signal and direct its components to the appropriate output system 260 of the computing device 150. For example, the computing device 150 may provide a visual marker representing the position of the non-automotive entity 140 relative to detected objects 160 or the geographic boundaries 185 on the mobile display accompanied by a haptic vibration, a directional arrow representing the predicted trajectory of the object 160 on the mobile display accompanied by the LED flash of the computing device 150, a visual marker representing the elevation of the non-automotive entity 140 accompanied by audio beeps that change duration depending upon on the elevation, etc. The tracking signal parameters may be controlled, for example, by user input via an application running on the computing device 150. In other words, the tracking information may be presented to the operator of the non-automotive entity 140 or the non-automotive entity 140 her/himself, i.e., wearable device user, via the computing device 150, in such a manner that one can determine the static or dynamic behavior the non-automotive entity 140.

Alternatively, the tracking signal may be output to the remote server 294 for remote tracking of the non-automotive entity 140. The processor(s) of the remote server 294 may parse the tracking signal and direct its components to an output system of the remote server 294.

Figure 4:
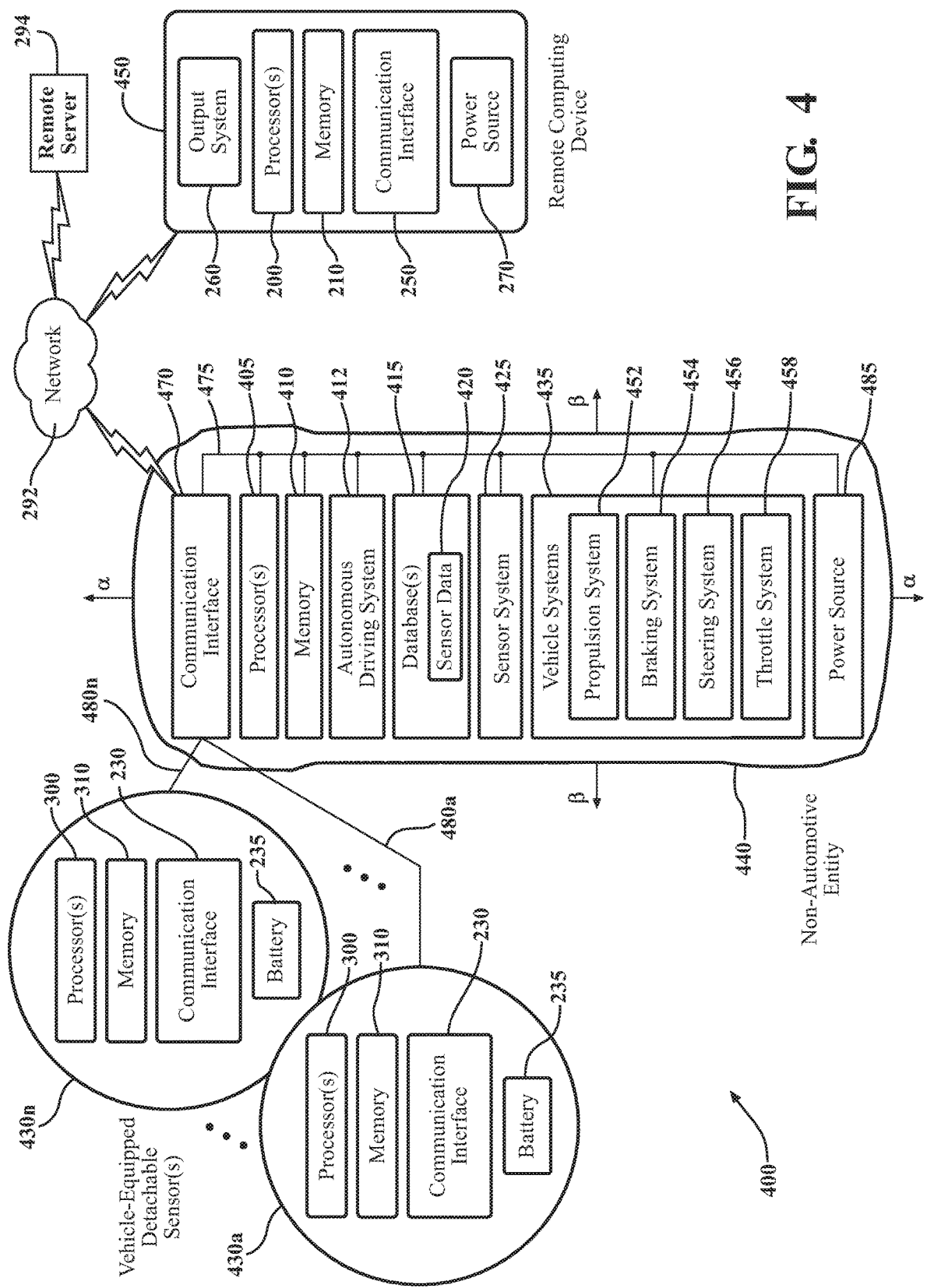
FIG. 4 is a block diagram of a mapping system capable of remote acquisition of sensor data.
Figure 5:
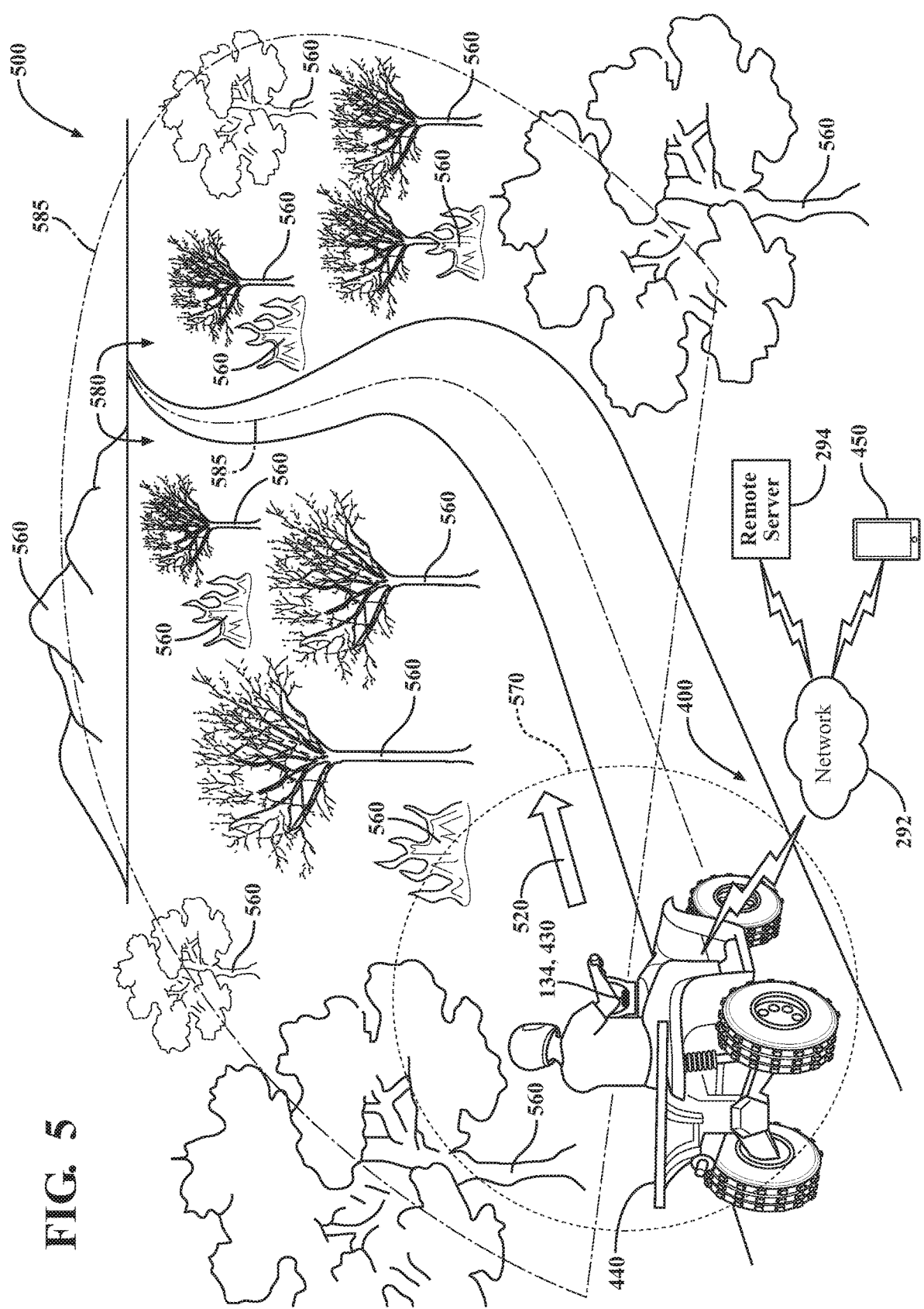
FIG. 5 is a perspective view of the mapping system of FIG. 4 including an unmanned non-automotive entity.

FIGS. 4-5 illustrate an example mapping system 400 that allows for unmanned operation of the non-automotive entity 440, which may, for example, allow for the acquisition of the sensor data 175 from a remote location. For example, the movement of the non-automotive entity 440 may be controlled remotely from, e.g., the remote computing device 450, the remote server 294, another remotely located computing device (not shown), etc., by a user of these remote devices (herein referred to as a "remote user"). As another example, the non-automotive entity 440 may have full autonomous control capability where an area 580 (FIG. 5) to be navigated by the autonomous capable non-automotive entity 440, i.e., geographic boundaries 585 (FIG. 5), may be received by the non-automotive entity 440 from the remote user.

In either case, the mapping system 400, as shown in FIG. 4, may be used for remote acquisition of sensor data 175 while the non-automotive entity 440 is unmanned and being controlled remotely by the remote user or traveling autonomously with navigation parameters, i.e., geographic boundaries 585, received by non-automotive entity 440 from the remote user. The mapping system 400 may be particularly useful for remotely accessing the map from the memory 310 while it is being built by the mapping system 400, for example, in harsh conditions or terrain where it may be dangerous for the non-automotive entity 440 to be manned. Additionally, or in the alternative, the remote user may monitor the movement (or lack thereof) of the non-automotive entity 440 via the tracking information that is output from the tracking module 335 to, for example, the remote computing device 450, the remote server 294, etc. The elements of the mapping system 400 that allow remote functionality will be described along with a supporting illustration, shown in FIG. 5, of an unmanned non-automotive entity 440 used for mapping a wildfire environment. The mapping system 400 differs from the mapping system 100 of FIGS. 1-2 in that the non-automotive entity 440 is configured for remote and/or autonomous operation.

FIG. 4 illustrates a block diagram of the mapping system 400 that includes the non-automotive entity 440 capable of remote and/or autonomous control, one or more vehicle-equipped detachable sensors 430, e.g., 430a-430n, and both the remote computing device 450 and the remote server 294 communicably coupled to the non-automotive entity 440 via the network 292. The vehicle-equipped detachable sensors 430 are configured as a "smart sensors," i.e., containing the one or more processors 300 and may include at least a portion of the memory 310. As described further below, an autonomous driving system 412 of the non-automotive entity 440 may be enhanced by the capabilities of the mapping system 400.

Some of the possible elements of the non-automotive entity 440 shown in FIG. 4 will now be described. However, it should be understood that it is not necessary for the non-automotive entity 440 to include all of the elements shown in FIG. 4 or described herein. The non-automotive entity 440 can have any combination of the various elements shown in FIG. 4. Furthermore, the non-automotive entity 440 can have additional elements to those shown in FIG. 4. Further, while various elements are shown as being located within the non-automotive entity 440, one or more of these elements can be located external to the non-automotive entity 440, and the elements shown may be physically separated by large distances.

The non-automotive entity 440 can include one or more processors 405. The processor(s) 405 can be any component or group of components that are configured to execute any of the processes attributable to the operation of the non-automotive entity 440 or any form of instructions to carry out such processes or cause such processes to be performed.

The non-automotive entity 440 can include a memory 410. The memory 410 can include one or more forms of computer-readable media, and store instructions executable by the processor(s) 405 for performing various operations of the non-automotive entity 440. Examples of suitable memory 410 includes RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, external hard drives, flash drives, or any other suitable storage medium, or any combination thereof.

The processor(s) 300 and the memory 310 of the mapping system 400 may be completely contained within the vehicle-equipped detachable sensors 430, the remote computing device 450, the non-automotive entity 440, the remote server 294 or be distributed among the vehicle-equipped detachable sensors 430, the remote computing device 450, the non-automotive entity 440 and/or the remote server 294. The processor(s) 405 and the memory 410 may be a part of the mapping system 400, the mapping system 400 may include separate processor(s) and memory from the processors(s) 405 and the memory 410, or the mapping system 400 may access the processor(s) 405 and the memory 410 through a data bus or another communications path. In the same manner as the computing device 150 set forth above, processor(s) 200 and memory 210 of the remote computing device 450 may include the processor(s) 300 and/or memory 310 functionality. As an example of a completely distributed mapping system 400, the vehicle-equipped detachable sensors 430 may include one of the processors 300 and the memory 310 executing and storing the monitoring module 320, respectively, the remote computing device 450 may include one of the processors 300 and the memory 310 executing and storing the mapping module 330, respectively, and the non-automotive entity 440 (or the remote server 294) may include one of the processors 300 and the memory 310 executing and storing the tracking module 335, respectively.

In either case, in one or more arrangements of the mapping system 400, the vehicle-equipped detachable sensors 430 may include at least one of the one or more processors 300 and the memory 310, the remote computing device 450 may include at least one of the one or more processors 300 and the memory 310, the non-automotive entity 440 may include at least one of the one or more processors 300 and the memory 310 and the remote server 294 may include at least one of the one or more processors 300 and the memory 310. The processor(s) 200, the processor(s) 300, the processor(s) 405 and the processor(s) of the remote server may be operatively connected to each other and may process any portion of the modules 320, 325, 330, and 335 in any combination. The memory 210, the memory 310, the memory 410 and the memory of the remote server may be operatively connected to each other and may store any portion of the modules 320, 325, 330, and 335 in any combination.

The non-automotive entity 440 can include one or more databases 415 for storing one or more types of data. The database(s) 415 can be a component of the memory 410, the processor(s) 405, or the database(s) 415 can be operatively connected to the processor(s) 405 and/or the memory 410 for use thereby. The database(s) 415 can include sensor data 420. In this context, "sensor data 420" means any information about the sensors that the non-automotive entity 440 is equipped with. As will be explained below, the non-automotive entity 440 can include a sensor system 425. The sensor data 420 can relate to one or more sensors of the sensor system 425. The database(s) 415 may be a part of the mapping system 400 and may store a portion of the database 350 of the mapping system 400, e.g., the sensor data 175, etc.

The non-automotive entity 440 can include one or more modules, at least some of which are described herein. The modules can be implemented as computer-readable program code that, when executed by a processor, implement one or more of the various processes described herein. One or more of the modules can be a component of the processor(s) 405, or one or more of the modules can be executed on and/or distributed among other processing systems to which the processor(s) 405 is operatively connected. The modules can include instructions (e.g., program logic) executable by one or more processor(s) 405. Alternatively, or in addition, one or more databases 415 may contain such instructions.

The non-automotive entity 440 can also include a sensor system 425. The sensor system 425 can include one or more sensors. The one or more sensors can be configured to monitor something in the environment around the non-automotive entity 440. The one or more sensors can detect, determine, and/or sense information about the non-automotive entity 440 itself. The sensor system 425 can be positioned anywhere in or on the non-automotive entity 440. The one or more sensors can be configured to detect, and/or sense in real-time.

In arrangements in which the sensor system 425 includes a plurality of sensors, the sensors can work independently from each other. Alternatively, two or more of the sensors can work in combination with each other. In such case, the two or more sensors can form a sensor network. The sensor system 425 and/or the one or more sensors can be operatively connected to the processor(s) 405, the database(s) 415, and/or another element of the non-automotive entity 440. The sensor system 425 can acquire data of at least a portion of the external environment of the non-automotive entity 440.

The non-automotive entity 440 can include a communication interface 470. The communication interface 470 of the non-automotive entity 440 is implemented via an antenna, circuits, chips, or other electronic components that facilitates wired and/or wireless communication between the components of the remote computing device 450 and/or the remote server and the non-automotive entity 440 via the network 292, as well as between the vehicle-equipped detachable sensors 430 and the non-automotive entity 440 via the one or more second links 480, e.g., 480a-480n. The communication interface 470 may be programmed to communicate in accordance with any number of wired or wireless communication protocols. For instance, the communication interface 470 may be programmed to communicate in accordance with a satellite-communication protocol, a cellular-based communication protocol (LTE, 3G, etc.), Bluetooth®, Bluetooth® Low Energy, Ethernet, the Controller Area Network (CAN) protocol, Wi-Fi, the Local Interconnect Network (LIN) protocol, the Universal Serial Bus (USB) protocol, etc.

The non-automotive entity 440 may be configured so that the components of the non-automotive entity 440 can communicate with each other using a controller area network (CAN) bus 475 or the like. Alternatively, any of the elements and/or systems described herein may be directly connected to each other without the use of a bus. Also, connections between the elements and/or systems described herein may be through another physical medium (such as wired connections), or the connections may be wireless connections.

The non-automotive entity 440 can include a power source 485. The power source 485 may provide power to one or more systems and/or subsystems of the non-automotive entity 440. The power source 485 may be, for example, a rechargeable battery (e.g., lithium ion, lead acid, etc.), a generator, etc. The power source 485 may be used to power and/or recharge the battery 235 of the vehicle-equipped detachable sensors 430 via the one or more second links 480.

The non-automotive entity 440 can include one or more vehicle systems 435 that effect movement of the non-automotive entity 440. Various examples of the one or more vehicle systems 435 that effect movement of the non-automotive entity 440 are shown in FIG. 4. However, the non-automotive entity 440 can include more, fewer, or different vehicle systems 435. It should be appreciated that although particular vehicle systems 435 are separately defined, each or any of the systems or portions thereof may be otherwise combined or segregated via hardware and/or software within the non-automotive entity 440. The non-automotive entity 440 can include, e.g., a propulsion system 452, a braking system 454, a steering system 456 and a throttle system 458. Each of these systems can include one or more devices, components, and/or combination thereof, now known or later developed.

The non-automotive entity 440 can include the autonomous driving system 412. The autonomous driving system 412 may be configured to operate in a full autonomous mode. More specifically, the non-automotive entity 440 may operate in an autonomous mode without human intervention through receiving control instructions from the autonomous driving system 412. The autonomous driving system 412 may include control instructions that when processed by the processor(s) 405 cause the non-automotive entity 440 to, for example, accelerate (e.g., by commanding the propulsion system 452 to increase the supply of fuel, and/or the throttle system 458 in increase speed), decelerate (e.g., by commanding the propulsion system 452 to decrease the supply of fuel, and/or the braking system 454 to apply the brakes), and/or change direction (e.g., by commanding the steering system 456 to turn the front two wheels). As used herein, "cause" or "causing" means to make, force, compel, direct, command, instruct, and/or enable an event or action to occur or at least be in a state where such event or action may occur, either in a direct or indirect manner.

The autonomous driving system 412 can be configured to determine travel path(s), current autonomous driving maneuvers for the non-automotive entity 440, future autonomous driving maneuvers and/or modifications to current autonomous driving maneuvers based on data from the sensors of the sensor system 425 and/or other systems of the non-automotive entity 440 (not shown) to enable safe navigation to an intended destination. "Driving maneuver" means one or more actions that effect movement of the non-automotive entity 440. Examples of driving maneuvers include: accelerating, decelerating, braking, turning, moving in a lateral direction of the non-automotive entity 440, changing travel lanes, merging into a travel lane, and/or reversing, just to name a few possibilities.

The autonomous driving system 412 may be enhanced by the addition of one or more vehicle-equipped detachable sensors 430 from the automotive vehicle 110. For example, the non-automotive entity 440 may be equipped with basic autonomous capabilities, e.g., limited range sensors, limited maneuverable capability, etc. as compared to the autonomous capabilities of the automotive vehicle 110. The autonomous driving system 412 may utilize the information generated by the mapping system 400, i.e., the mapping system 400 may share information with the autonomous driving system 412. For example, the autonomous driving system 412 may access and utilize the acquired sensor data 175 from the monitoring module 320, i.e., from the vehicle-equipped detachable sensors 430, to enhance the current and/or future autonomous driving maneuvers. Additionally, or in the alternative, the autonomous driving system 412 may access and utilize the 2D, 3D and/or real-time maps built by the mapping module 330 to enhance the current and/or future autonomous driving maneuvers.

The remote computing device 450 includes devices that are configured to communicate with the non-automotive entity 440 in a wireless fashion via the network 292. The remote computing device 450 may be, for example, a smart phone, a tablet, phablets, laptop computer, standard-sized computer, etc., or any other computing device that may be capable of wireless communication with the non-automotive entity 440 via the network 292.

For example, in one arrangement, the remote computing device 450 may receive the tracking signal from the tracking module 335 remotely. In this case, the tracking module 335 may be stored in the memory 410 and executed by the processor(s) 405 of the non-automotive entity 440. In another arrangement, the remote computing device 450 may include the monitoring module 320 and the vehicle-equipped detachable sensors 430 can be configured to communicate with the remote computing device 450 through the non-automotive entity 440. For example, the remote computing device 450 may acquire sensor data 175 from the vehicle-equipped detachable sensors 430 that are configured to transmit data through a gateway facilitated by the communication interface 470 of the non-automotive entity 440.

To further illustrate how the mapping system 400 promotes remote access to sensor data 175, maps, remote tracking, etc., FIG. 5 will be discussed. FIG. 5 shows an active wildfire region 500, where it may be too dangerous for a human to enter. An unmanned non-automotive entity 440, for example, a fire-resistant ATV, embarks on entering the wildfire region 500. The ATV includes a vehicle-equipped detachable sensor 430, for example, the LIDAR sensor 134, mounted to the handlebars of the ATV. The movement of the ATV may be remotely controlled via the network 292, for example, by a remote user using an application running on the remote computing device 450 or a program running on the remote server 294. The remote user enters in the geographic boundaries 585 of the area 580 of the wildfire region 500 that she/he wants to survey, i.e., map, into the remote computing device 450 and is received by the mapping system 400. The modules 320, 325, 330 and 335 may be located, for example, on the non-automotive entity 440, i.e., the ATV, and the geographic boundaries 585 are received by the mapping system 400 via the communication interface 470. The geographic boundaries 585 include values that specify, for example, a logging trail 510 of interest that is to be included in the geographic boundaries 585 within the area 580 to be traveled by the ATV. The remote user enters a time interval, for example, 30 seconds, into the remote computing device 450 that is received by the mapping system 400. For example, the 30 second time interval may be an optimized value between resolution of the map and memory usage.

As the remote user controls the movement of the ATV around the area 580, the acquired sensor data 175 of the environment 570 around the non-automotive entity 440, i.e. the ATV, and subsequent 2D and/or 3D maps of the detected objects 560 are stored in the memory 310 located on the LIDAR sensor 134, the remote computing device 450, the ATV and/or the remote server 294. The maps may be built dynamically and viewed by the remote user via the remote computing device 450 or the remote server 294. The maps may be built by the mapping module 330 after the journey from the stored sensor data 175. The remote user may receive and monitor the tracking information received by the remote computing device 450 or the remote server 294. The tracking information may include the predicted trajectory 520, as well as other tracking information, as set forth above. While the ATV is being guided through the wildfire region 500 by the remote user, if the ATV ventures outside of the area 580, the mapping system 400 may not acquire sensor data 175. The mapping system 400 may keep track of the location of the ATV relative to the geographic boundaries 585 from the tracking information, for example, from information received by a navigation unit onboard the ATV.

Alternatively, the ATV may be a fully autonomous non-automotive entity 440. In this case, the geographic boundaries 585 may be received by the autonomous driving system 412 via the communication interface 470. The mapping system 400 may acquire sensor data 175 of the environment 570 around the ATV while autonomously traveling the area 580 defined by the geographic boundaries 585. The mapping module 330 may build and store a real-time map. The real-time map may be shared and accessed by the autonomous driving system 412 so that the autonomous ability of the ATV may be enhanced.

In either case, the mapping system 400, in one arrangement, may build a map, from acquired sensor data, of an area traveled by the non-automotive entity 440. In another arrangement, the mapping system 400 may determine the tracking information about the non-automotive entity 440, and in response to determining the tracking information, output at least one tracking signal to, e.g., the remote computing device 450. In yet another arrangement, the mapping system 400 may build a map an area and determine the tracking information of the non-automotive entity 440. In the latter arrangement, for example, the remote user may monitor the progress of the map being built by accessing the memory 310 while the non-automotive entity 440 is traveling the area, as well as track, for example, the current trajectory, of the non-automotive entity 440 via, e.g., the remote computing device 450. Alternatively, the remote user may simply track the non-automotive entity 440 from the tracking information while determining where to build the map.

Figure 6:
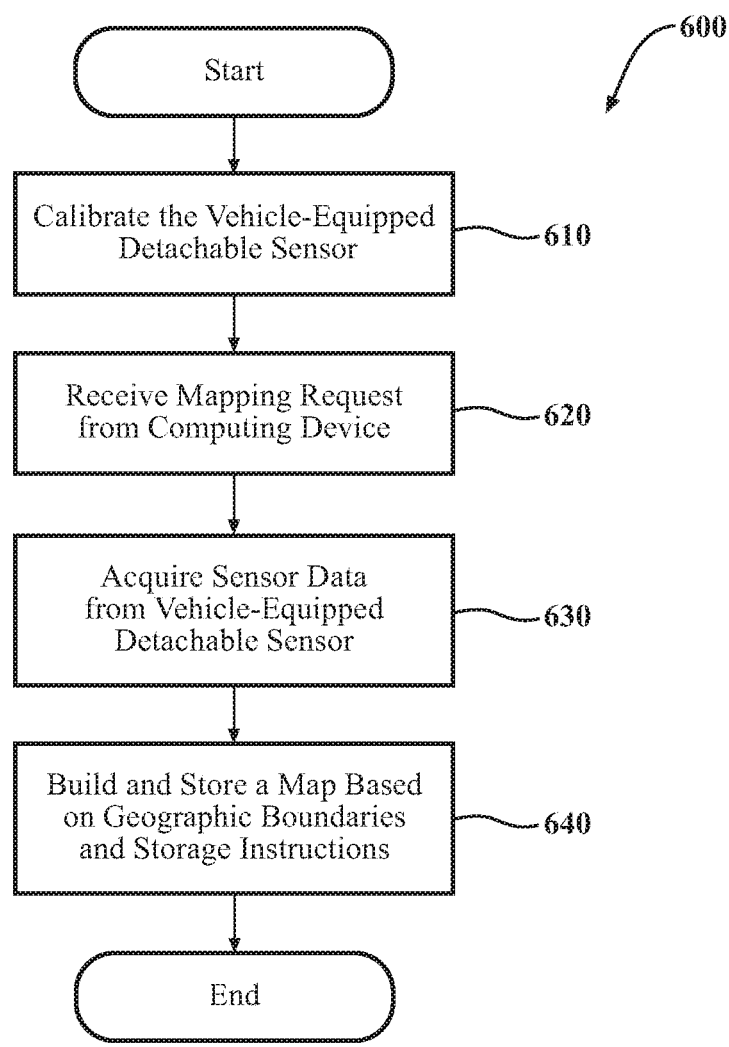
FIG. 6 is a flowchart illustrating one example of a method that is associated with extending the usage of a vehicle-equipped detachable sensor from an automotive vehicle to a non-automotive entity for environmental mapping.

FIG. 6 illustrates a flowchart of a method 600 that is associated with extending the usage of the vehicle-equipped detachable sensors 130, 430 for environmental mapping. Method 600 will be discussed from the perspective of the mapping systems 100, 400 of FIGS. 1-5. While method 600 is discussed in combination with the mapping systems 100, 400 it should be understood that the method 600 is not limited to being implemented within the mapping systems 100, 400, but instead are examples of systems that may implement the method 600. The steps that are illustrated herein as part of the method 600 are not limited to this particular chronological order. Indeed, some of the steps may be performed in a different order than what is shown and/or at least some of the steps shown can occur simultaneously.

As an initial matter, it should be noted that prior to acquiring sensor data 175 at block 630, the one or more vehicle-equipped detachable sensors 130, 430 may need to be calibrated to their respective mounting location on the non-automotive entity 140, 440. Thus, the described method 600, in one embodiment, includes a calibration step that is performed by block 610 that generally occurs before block 630. However, the calibration step of block 610 may occur in parallel to the method 600. For example, the vehicle-equipped detachable sensor 130, 430 may need to be re-calibrated for whatever reason. Moreover, the calibration step of block 610 may not be necessary at all, as set forth above, and the method 600 starts at block 620.

At block 610, the calibration module 325, in one or more arrangements, may be accessed automatically when the vehicle-equipped detachable sensor 130, 430 is detached and mounted to the non-automotive entity 140, 440. For example, the calibration module 325 is automatically accessed by the mapping system 100, 400 when, e.g., the power to the vehicle-equipped detachable sensor 130, 430 is removed and restored upon detachment and attachment, the calibration module 325 determines that a re-calibration is needed (e.g., the current calibration is outdated), etc. In other arrangements, the calibration module 325 may be accessed manually via, e.g., a calibration application running on the computing device 150 that receives mounting location parameters from the non-automotive entity 140, 440, etc. In either case, once the calibration module 325 is initiated, the calibration module 325 can recall a previous calibration indexed in the memory 310. The calibration module 325 can determine if a new calibration is needed, e.g., the calibration is outdated, mounting location parameters have changed, no calibration exists, etc. If calibration is needed, the calibration module 325 can access data acquired by the monitoring module 320, request that the monitoring module 320 acquired new sensor data, and/or obtain mounting location parameters, as set forth above. Once the calibration module 325 is completed with the calibration, i.e., configuring the vehicle-equipped detachable sensor 130, 430 to the mounting location on the non-automotive entity 140, 440, the calibration module 325 can index a new calibration and store the new calibration in the memory 310. The method 600 may then proceed to block 620.

At block 620, the mapping module 330 receives the mapping request, in one arrangement, from the computing device 150 or remote computing device 450. In another arrangement, the mapping request may be received from the remote server 294. The operator of the non-automotive entity 140, the non-automotive entity 140 her/himself, i.e., the wearable device user, or the remote user may enter the mapping request into the associated device via, for example, an application or program running on the associated device. In response to mapping module 330 receiving the mapping request, the method 600 proceeds to block 630.

At block 630 the monitoring module 320 acquires sensor data 175 from the vehicle-equipped detachable sensor 130, 430 and stores the data in the database 350, i.e., the memory 310. In general, the monitoring module 320 continuously acquires data in order to continually update a perception of the surrounding environment around the non-automotive entity 140, 440 when the vehicle-equipped detachable sensor 130, 430 is mounted to the non-automotive entity 140, 440. Thus, while the method 600 is discussed in a generally serial manner, it should be appreciated that the mapping systems 100, 400 can execute multiple iterations of block 630 in order to maintain awareness of the surrounding environment. Moreover, because certain aspects of the acquired data are temporal in nature (e.g., tracking of moving objects), the monitoring module 320 can continuously acquire data and maintain the data as a temporal stream of data. Thus, the monitoring module 320 acquires data from the vehicle-equipped detachable sensor 130, 430 and stores the data in the memory 310 for future analysis. The monitoring module 320 configures the vehicle-equipped detachable sensor 130, 430 to detect objects associated with the acquired sensor data 175 in the environment around the non-automotive entity 140, 440 when the vehicle-equipped detachable sensor 130, 430 is mounted to the non-automotive entity 140, 440. The method 600 then proceeds to block 640.

At block 640, the mapping module builds the map based on geographic boundaries and storage instructions received from the computing device 150, the remote computing device 450 or the remote server 294. The geographic boundaries define the area 180, 580 and the map is built, from the acquired sensor data 175, of the area 180, 580 that is traveled by the non-automotive entity 140, 440. The area 180, 580 can be traveled by the non-automotive entity 140, 440 while under human control, full autonomus control and/or remote control. The map may include 2D, 3D or real-time maps. The mapping module may store the map or the sensor data 175 needed to build the map at a later time to the memory 310 based on the storage instructions received from the the computing device 150, the remote computing device 450 or the remote server 294. The storage instuctions may be to store the map or sensor data 175 every time interval or distance interval, as set forth above. After the map is built, the method 600 is terminated.

Figure 7:
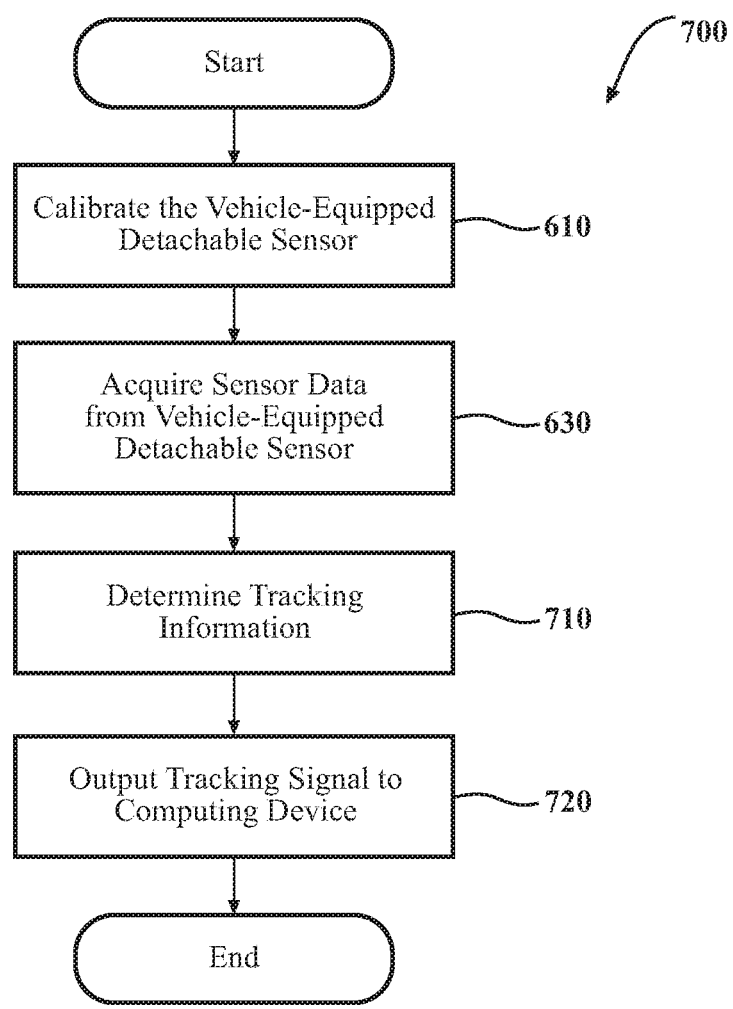
FIG. 7 is a flowchart illustrating another example of a method that extends the flowchart of FIG. 6 to tracking the non-automotive entity.

FIG. 7 illustrates a method 700 that is associated with determining tracking information from the acquired sensor data 175. While method 700 is discussed in combination with the mapping systems 100, 400, it should be understood that the method 700 is not limited to being implemented within the mapping systems 100, 400, but instead are examples of systems that may implement the method 600. Moreover, an in-depth discussion of blocks 610 and 630 will not be provided since the basic functionality associated with the noted blocks is discussed in relation to method 600.

Method 700 begins with calibrating the vehicle-equipped detachable sensor 130, 430 at block 610 and acquiring sensor data 175 from the one or more vehicle-equipped detachable sensors 130, 430 at block 630. For purposes of brevity, the discussion of blocks 610 and 630 will not be repeated.

At block 710, the tracking module 335 can determine the tracking information about the non-automotive entity 140, 440 from the acquired sensor data 175. The tracking information may include the position of the non-automotive entity 140, 440 relative to the detected object 160, the velocity of the non-automotive entity 140, 440, the elevation of the non-automotive entity 140, 440 and the current and predicted trajectories of the non-automotive entity 140, 440. The tracking module 330 may determine the location of the non-automotive entity 140, 440 relative to the geographic boundaries 185, 585 based on the data received from the navigation unit of the computing device 150 or the navigation unit on board the non-automotive entity 440. In response to determining the tracking information, i.e., at least one static or dynamic determination regarding the non-automotive entity 140, 440, the method proceeds to block 720.

At block 720, as a result of the tracking module 330 determining the tracking information about the non-automotive entity 140, 440, the the tracking module 335 can output at least one tracking signal to the computing device 150, the remote computing device 450 and/or the remote server 294. The devices 150, 450 and 294 may receive the the tracking signal corresponding to the tracking information, decode the tracking signal and direct the decoded information to the appropriate output system of the devices 150, 450 and 294. The tracking signal informs the operator, the non-automotive entity 140, 440 her/himself, i.e., wearable device user, or the remote user of the static or dynamic behavior of the non-automotive entity 140, 440. After the tracking signal is output the the computing device 150, the remote computing device 450 and/or the remote server 294, the method 700 is then terminated.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A mapping system comprising:
a vehicle-equipped detachable sensor capable detecting an object within a portion of an environment around an automotive vehicle and configured to communicate with a computing device, the vehicle-equipped detachable sensor structured to be detached from the automotive vehicle and mounted to a non-automotive entity;
one or more processors;
a memory communicably coupled to the one or more processors and storing:
a monitoring module including instructions that when executed by the one or more processors cause the one or more processors to acquire sensor data from the vehicle-equipped detachable sensor of an environment around the non-automotive entity when the vehicle-equipped detachable sensor is mounted to the non-automotive entity; and
a mapping module including instructions that when executed by the one or more processors cause the one or more processors to:
receive a mapping request from the computing device; and
in response to the mapping request, build a map, from the acquired sensor data, of an area traveled by the non-automotive entity.

2. The mapping system of claim 1, wherein the area is based on geographic boundaries received from the computing device.

3. The mapping system of claim 1, wherein the map includes at least one of a two-dimensional map, a three-dimensional map and a real-time map.

4. The mapping system of claim 1, wherein the mapping module further includes instructions to store the map of the area to the memory based on storage instructions received from the computing device, wherein the storage instructions include at least one of a time interval and a distance interval.

5. The mapping system of claim 1, further comprising a tracking module, the tracking module including instructions that when executed by the one or more processors cause the one or more processors to determine tracking information about the non-automotive entity based at least in part on the acquired sensor data.

6. The mapping system of claim 5, wherein the tracking information includes at least one of a position of the non-automotive entity, a velocity of the non-automotive entity, an elevation of the non-automotive entity, a current trajectory of the non-automotive entity, and a predicted trajectory of the non-automotive entity.

7. The mapping system of claim 5, wherein the tracking module further includes instructions to, in response to determining the tracking information, output at least one tracking signal to the computing device.

8. The mapping system of claim 1, wherein the vehicle-equipped detachable sensor includes at least one of the one or more processors, the memory, and a battery.

9. The mapping system of claim 1, wherein the vehicle-equipped detachable sensor is configured to communicate with the computing device through the non-automotive entity.

10. The mapping system of claim 1, further comprising a calibration module, the calibration module including instructions that when executed by the one or more processors cause the one or more processors to calibrate the vehicle-equipped detachable sensor to a portion of the environment around the non-automotive entity based at least in part on mounting location parameters associated with a mounting location of the vehicle-equipped detachable sensor on the non-automotive entity.

11. A method comprising:
acquiring sensor data from a vehicle-equipped detachable sensor of an environment around a non-automotive entity when the vehicle-equipped detachable sensor is mounted to the non-automotive entity, the vehicle-equipped detachable sensor capable of detecting an object within a portion of an environment around an automotive vehicle and configured to communicate with a computing device, the vehicle-equipped detachable sensor structured to be detached from the automotive vehicle and mounted to the non-automotive entity;
receiving a mapping request from the computing device; and
in response to the mapping request, building a map, from the acquired sensor data, of an area traveled by the non-automotive entity.

12. The method of claim 11, wherein the area is based on geographic boundaries received from the computing device, and wherein the map includes at least one of a two-dimensional map, a three-dimensional map and a real-time map.

13. The method of claim 11, further comprising:
storing the map of the area to a memory based on storage instructions received from the computing device, wherein the storage instructions include at least one of a time interval and a distance interval.

14. The method of claim 11, further comprising:
determining tracking information about the non-automotive entity based at least in part on the acquired sensor data, wherein the tracking information includes at least one of a position of the non-automotive entity, a velocity of the non-automotive entity, an elevation of the non-automotive entity, a current trajectory of the non-automotive entity, and a predicted trajectory of the non-automotive entity.

15. The method of claim 14, further comprising:
in response to determining the tracking information, outputting at least one tracking signal to the computing device.

16. A tracking system comprising:
a vehicle-equipped detachable sensor capable of detecting an object within a portion of an environment around an automotive vehicle and configured to communicate with a computing device, the vehicle-equipped detachable sensor structured to be detached from the automotive vehicle and mounted to a non-automotive entity;
one or more processors;
a memory communicably coupled to the one or more processors and storing:
a monitoring module including instructions that when executed by the one or more processors cause the one or more processors to acquire sensor data from the vehicle-equipped detachable sensor of an environment around the non-automotive entity when the vehicle-equipped detachable sensor is mounted to the non-automotive entity; and
a tracking module including instructions that when executed by the one or more processors cause the one or more processors to determine tracking information about the non-automotive entity based at least in part on the acquired sensor data.

17. The tracking system of claim 16, wherein the tracking information includes at least one of a position of the non-automotive entity, a velocity of the non-automotive entity, an elevation of the non-automotive entity, a current trajectory of the non-automotive entity, and a predicted trajectory of the non-automotive entity.

18. The tracking system of claim 17, wherein the tracking module further includes instructions to, in response to determining the tracking information, output at least one tracking signal to the computing device.

19. The tracking system of claim 16, wherein the vehicle-equipped detachable sensor is configured to communicate with the computing device through the non-automotive entity.

20. The tracking system of claim 16, wherein the vehicle-equipped detachable sensor includes at least one of the one or more processors, the memory, and a battery.

* * * * *